Figure 3:
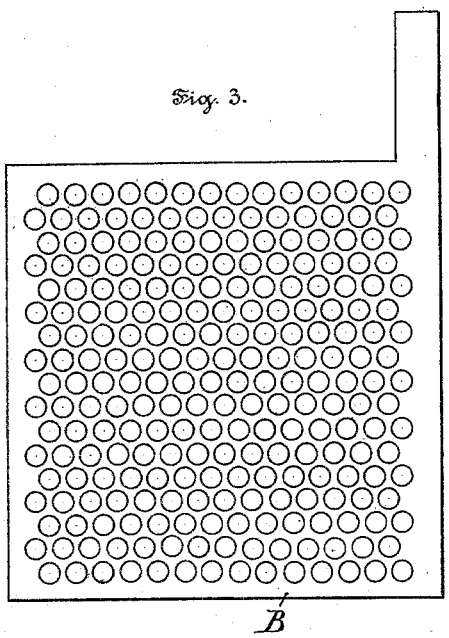

(No Model.) 2 Sheets—Sheet 1.
S. C. C. CURRIE.
METHOD OF ELECTROLYTICALLY REDUCING PLATES FOR SECONDARY BATTERIES.
No. 412,323. Patented Oct. 8, 1889.
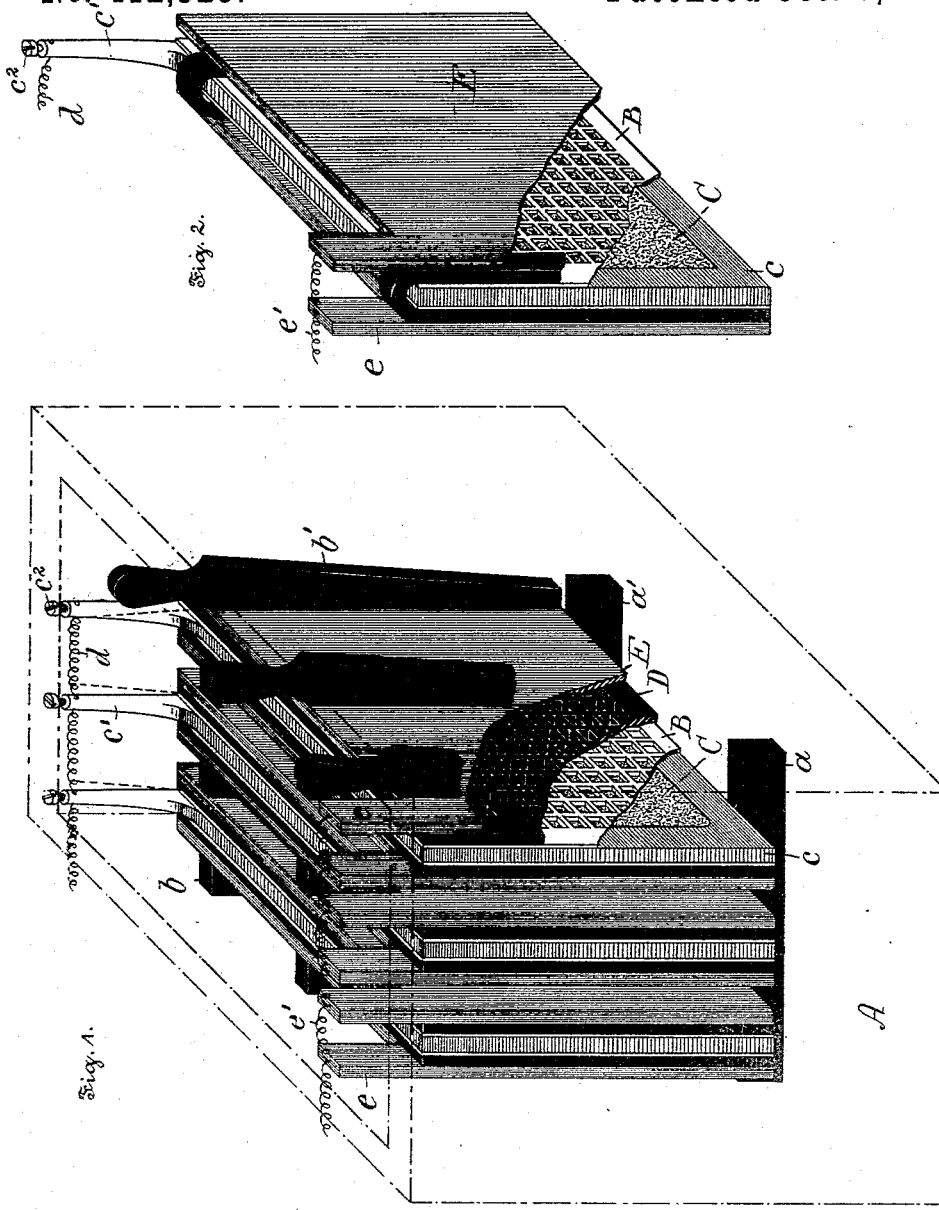

(No Model.) 2 Sheets—Sheet 2.

S. C. C. CURRIE.
METHOD OF ELECTROLYTICALLY REDUCING PLATES FOR SECONDARY BATTERIES.

No. 412,323. Patented Oct. 8, 1889.

Witnesses:
Hermann Bormann.
Thomas M. Smith.

Inventor:
Stanley C. C. Currie,
by J. Walter Douglas
Atty.

UNITED STATES PATENT OFFICE.

STANLEY C. C. CURRIE, OF PHILADELPHIA, PENNSYLVANIA, ASSIGNOR TO THE UNITED ELECTRIC IMPROVEMENT COMPANY, OF GLOUCESTER CITY, NEW JERSEY.

METHOD OF ELECTROLYTICALLY REDUCING PLATES FOR SECONDARY BATTERIES.

SPECIFICATION forming part of Letters Patent No. 412,323, dated October 8, 1889.

Application filed April 19, 1889. Serial No. 307,754. (No model.)

*To all whom it may concern:*

Be it known that I, STANLEY CHARLES CUTHBERT CURRIE, a subject of the Queen of Great Britain, but now residing at the city of Philadelphia, in the county of Philadelphia and State of Pennsylvania, have invented certain new and useful Improvements in the Method of Electrolytically Reducing Plates Composed of Metallic Salts to a Metallic State to Form the Electrodes of Secondary or Storage Batteries, of which the following is a specification.

My invention has relation to a certain new and novel method of reducing plates formed more particularly of metallic salts by electrolysis to a metallic state or condition to form the electrodes of secondary or storage batteries.

Metal plates for use as electrodes of secondary or storage batteries have been made by subjecting one or more salts of a metal or metals in variable proportions to fusion, and then in the cooling of the mass causing the same to assume a solid crystallized form, when a frame of suitable material was cast around the plate, and then reduced to a metallic state by electrolysis, whereby was produced a porous crystallized metal plate or electrode having substantial strength.

In the instance of a plate to be used for a secondary or storage battery composed of a salt of lead (a bad conductor of electricity to be reduced to a state of porous metallic lead by electrolysis) it is important that the reduction should be effected evenly and uniformly over the entire surface of the plate. If the plate in its preliminary state in the form of a salt of lead (a bad conductor of electricity) be held in a frame of a good conducting metal or material—such as metallic lead—reduction will commence to take place from the edges of the salt plate in the direction of the center thereof, and this not only consumes much time, but, moreover, causes a reduction of the plate to take place across the line of cleavage or crystallization or pores thereof in a properly-constituted plate.

The principal object of my invention is to overcome the above-mentioned objectionable results, and to not only hasten, facilitate, and attain a more perfect electrolytic reduction of a plate composed of one or more metallic salts of low electrical conductivity to a metallic state, but to prevent the plates from buckling, bending, and warping during reduction, and to cause reduction to take place in the direction of the line of cleavage or of the pores of the plate.

My invention consists in increasing the effective area of the electrical conducting material of the plates during the reduction to a metallic state by causing the reduction to commence over the entire surface and gradually work its way through the plate in the line of cleavage or crystallization, thereby materially lessening the time required to reduce the plates and giving as a product plates of a superior character for use as the electrodes of a secondary or storage battery.

My invention furthermore consists in supporting and firmly holding the plates during their electrolytic reduction, whereby superior plates are produced.

My invention may be carried into effect as follows: Two systems of plates are immersed in a vase containing water and sulphuric acid in the proportion of ten per cent., more or less. To hasten or facilitate and finally attain a more perfect electrolytic reduction of the salt or crystallized plates, each is mounted in a vase between two plates composed, preferably, of a metal the same as the crystallized plate is a salt of or other suitable material, and said plates firmly pressed against the faces of the crystallized plates. These metal or conducting plates in contact with the faces of the crystallized plates are provided with square, circular, or other preferred-shaped holes; or instead of perforated metal plates a series of metallic rods may be used for obtaining a good contact with the active matter or conducting materials of the salt plates to be reduced. Preference, however, is given to the use of perforated plates for the purpose, because the most excellent results can be obtained. Alongside and in contact with each of the perforated metal plates is placed an insulating plate or rod composed of rubber or other suitable material. Against this rod or perforated plate of insulating material and separated by the same from the perforated metal plate is placed a solid plate of ordinary lead or other material of equal dimension. The plates having been mounted in the vase in the manner described, the system of crystallized plates, and of course with the perforated metal plates in contact with the faces thereof, are connected through a wire with the negative electrode of a dynamo or other source of electricity, while the system of solid metal, lead, or other plates are connected through a wire with the positive electrodes of the same, and in the electrolytic reduction allowed to take place the system of crystallized plates are reduced to a metallic state. The system of plates constituting the anodes are of course insulated from those constituting the cathodes.

The nature and characteristic features of my invention will be more fully understood taken in connection with the accompanying drawings, forming part hereof, and in which—

Figure 4:
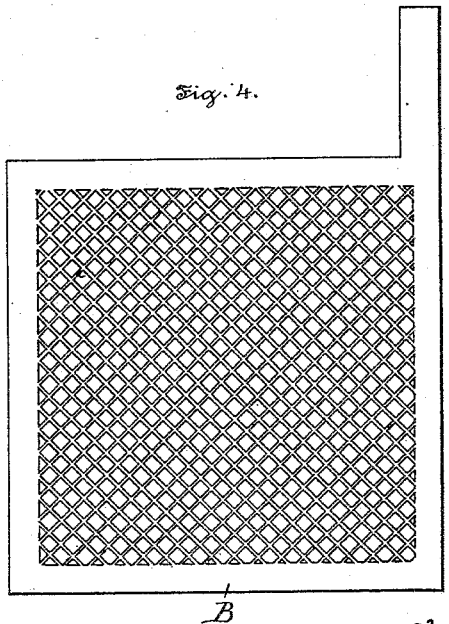
Figure 5:
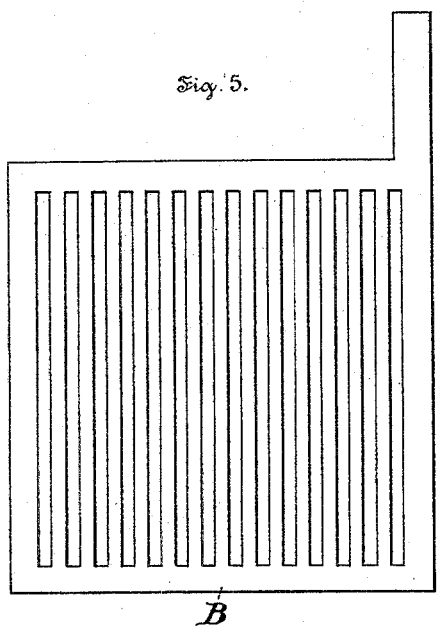
Figure 6:
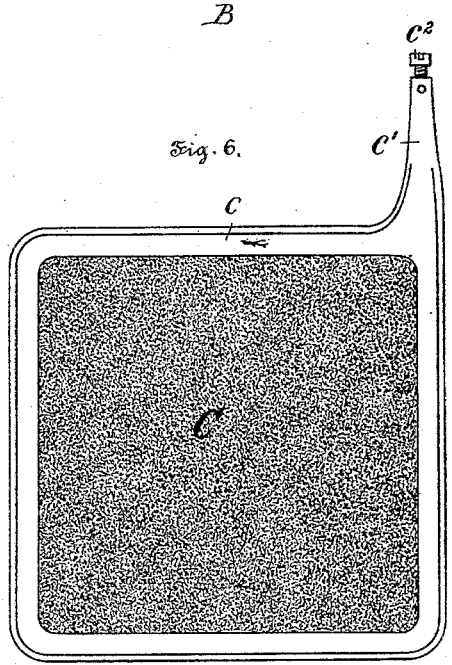

Figure 1 is a perspective view of a system of crystallized plates partially broken away and mounted in a fluid in a vase, and the said plates having on each of their sides or faces and in contact therewith a perforated metal plate, and a perforated insulating plate or rod resting against each of the perforated metal plates, and with a system of metal plates next to the said insulating-pieces. Fig. 2 is a perspective view of a single crystallized plate partially broken away, with a thin perforated metal plate in direct contact with each face thereof, and with an inverted-U-shaped insulating-piece fitted over the crystallized plate and the thin perforated plates in contact therewith, and also showing the solid lead plates, of equal dimension with the crystallized plates, pressing against the sides or faces of each inverted-U-shaped insulated rod. Fig. 3 is a side elevation of a plate provided with a series of round holes arranged in rows for contact with each face or side of the salt or chloride plate to be reduced to a metallic state. Fig. 4 is a similar view of a plate made of lead or other material, provided with square holes disposed diagonally or transversely throughout the plate. Fig. 5 is a similar view of a metal, lead, or other plate provided with vertical slits or openings therein; and Fig. 6 is a side elevation of a crystallized plate with a frame cast around the same, and provided with a terminal having a binding-screw for connecting a wire therewith, and illustrating a crystallized metal plate that has undergone electrolytic reduction.

Referring to the drawings, A is a vase in which the respective plates are mounted, immersed in a suitable fluid.

$a$ and $a'$ are insulating-bars in the bottom of the vase and on which the respective plates are mounted.

$b$ and $b'$ are vertical insulating bars or rods disposed so as to properly insulate the outer plates from the sides of the vase A.

B represents the perforated metal plates, composed of lead or other suitable material, of any of the forms illustrated in Figs. 3, 4, and 5, for mounting in contact with the crystallized plates to be reduced.

C represents a crystallized plate having a frame $c$ cast or otherwise formed around the same, with a terminal $c'$ and a binding-screw $c^2$, with which a wire $d$ is connected from a negative electrode of a dynamo. (Not shown.)

D is a perforated insulating-plate of, rubber or other material, occupying a position on each side between the perforated metal, lead, or other plate B, and the solid metal or lead plate E, with a terminal $e$, to which a wire $e'$ is attached from the positive electrode of a dynamo. (Not shown.) The two systems of plates properly insulated from the bottom and sides of the vase are held firmly in position in the vase A, in order to avoid bulging, warping, buckling, and bending of the plates to be reduced to a metallic state. The crystallized salt plates having been reduced to a metallic state in substantially the manner hereinabove described, the matter foreign to the particular metal required in them may be readily eliminated by removing said crystallized metal plates into another vase and mounting them in a fluid therein properly insulated from metal, lead, or other plates and the bottom and sides of the vase and connecting the terminals of the two systems of plates through wires with the electrodes of a dynamo—that is, with the system of metal, lead, or other plates connected with the negative electrode of the dynamo and the system of crystallized metal plates with the positive electrode of the dynamo, whereby a superior type of porous crystallized metal plates is obtained for use as the electrodes of a secondary or storage battery.

I desire it to be distinctly understood that my invention does not comprehend broadly a porous crystallized metallic plate; but my invention embraces simply the method hereinbefore described of reducing such type of plates among others to a metallic state to form the electrodes of a secondary or storage battery.

Having thus described the nature and objects of my invention, what I claim as new, and desire to secure by Letters Patent, is—

1. In the method of electrolytically reducing plates composed of one or more salts of a metal or metals to a metallic state, mounting the plates to be reduced in contact with perforated plates, and which latter plates are insulated from solid metal plates, substantially as and for the purposes set forth.

2. In the method of electrolytically reducing plates composed of a salt or salts of a metal or metals to a metallic state, mounting in a fluid in contact with the faces or sides of the plates to be reduced perforated metal plates, insulating-plates interposed between said perforated plates and solid metal plates, and causing the reduction of said plates composed of a metallic salt or salts, substantially as and for the purposes set forth.

3. The method of reducing crystallized plates to a metallic state, which consists in immersing in a fluid a system of perforated plates in contact with the crystallized plates forming cathodes and insulated from a system of solid metal plates forming the anodes, and then connecting said cathodes and anodes with a generator, substantially as and for the purposes set forth.

4. The method of electrolytically reducing crystallized plates to a metallic state, which consists in immersing in a fluid a system of perforated metal plates in contact with the crystallized plates and a system of solid metal plates insulated from said perforated opposing plates of similar material, and then connecting the cathodes and anodes with a generator, substantially as and for the purposes set forth.

5. The method of electrolytically reducing crystallized plates to a metallic state, which consists in immersing in a fluid a system of crystallized plates having perforated metal plates in contact with the faces thereof and perforated insulating-plates interposed between said perforated metal plates and solid metal plates, and then causing the reduction of said crystallized plates, substantially as and for the purposes set forth.

6. The method of electrolytically reducing crystallized plates to a metallic state, which consists in immersing in a fluid a system of crystallized plates in contact with perforated metal plates or devices and with perforated insulating-plates or devices interposed between said perforated metal plates and a system of solid metal plates of the same or other material, and then causing said crystallized plates to be reduced to a metallic state, substantially as and for the purposes set forth.

7. The method of electrolytically reducing plates composed of one or more salts of a metal or metals to a metallic state, which consists in immersing in a fluid the salt plates in contact with perforated metal plates, which latter are insulated from solid metal plates, and then causing reduction to a metallic state of said salt plates and elimination of extraneous matter therefrom, substantially as and for the purposes set forth.

In witness whereof I have hereunto set my signature in the presence of two subscribing witnesses.

STANLEY C. C. CURRIE.

Witnesses:
    GEO. W. REED,
    THOMAS M. SMITH.